United States Patent [19]

Redfield Stephen R. et al.

[11] Patent Number: 4,953,924
[45] Date of Patent: Sep. 4, 1990

[54] ENHANCED NONDESTRUCTIVE HOLOGRAPHIC RECONSTRUCTION

[75] Inventors: Redfield Stephen R., Austin, Tex.; Lambertus Hesselink, Woodside, Calif.

[73] Assignee: Microelectronics and Computer Technology Corporation, Austin, Tex.

[21] Appl. No.: 139,319

[22] Filed: Dec. 30, 1987

[51] Int. Cl.[5] ............................ G02F 1/01; G03H 1/04
[52] U.S. Cl. .................................... 350/3.64; 350/320; 350/389
[58] Field of Search ................. 350/3.64, 320, 374, 350/384, 389

[56] References Cited

U.S. PATENT DOCUMENTS 3,544,189 12/1970 Chen et al. ...................... 350/389 X
3,660,818 5/1972 Amodei et al. ................. 350/3.64 X
3,825,316 7/1974 Amodei ............................. 350/3.64

OTHER PUBLICATIONS

Yariv, A., et al, *Optical Waves in Crystals*, New York John Wiley & Sons, 1984 (TA 1677, Y37), preface and pp. 86-87 and 220-223.

Petrov, M. P., et al, "Diffraction of Light by Volume Phase Holograms in $Bi_{12}SiO_{20}$," *Opt. Spectroscop.* (USSR) 55 (2), Aug. 1983, pp. 192-195 ©1984 The Optical Society of America (350/3.64).

Staebler, D. L., et al., "Multiple Storage and Erasure of Fixed Holograms in Fe-Doped $LiNbO_3$", Applied Physics Letters, vol. 26, No, 4, Feb. 15, 1975, pp. 182-184.

Micheron, F.,e t al., "Electrical Control in Photoferroelectric Materials for Optical Storage", Applied Optics vo. 13, No. 4, Apr. 1974, pp. 784-787.

*Primary Examiner*—Bruce Y. Arnold
*Assistant Examiner*—Terry S. Callaghan
*Attorney, Agent, or Firm*—Fulwider, Patton, Lee & Utecht

[57] ABSTRACT

A method for promoting enhanced nondestructive reconstruction of holograms recorded in photorefractive media involves control of the polarization states of the reconstruction beam and the recording beams, control of the cummulative recording energy, and use of a relatively high external field applied across the media during recording which is subsequently reduced during reconstruction. The resulting reconstruction history characteristics are selectively tailored by adjusting the polarization and intensity of the reconstruction beam, the recording geometry, and the applied voltage during reconstruction and recording, and various other parameters. In general, the reconstruction efficiency starts at a relatively high level, initially reduces, and then subsequently grows above the starting value, and can be made substantially nondestructive over a typical reconstruction cycle, with erasure times exceeding forty-five minutes.

17 Claims, 5 Drawing Sheets

ENHANCED NONDESTRUCTIVE HOLOGRAPHIC RECONSTRUCTION

BACKGROUND OF THE INVENTION

This invention relates generally to holograms in photorefractive materials, and more particularly has reference to a new and improved method for promoting enhanced nondestructive reconstruction.

Holograms have been widely used for a variety of optical processing and data storage applications. For example, it is well known that information can be stored in a hologram by optically encoding the object recording beam. Increased data storage capacity is achieved by selectively shifting the directions of the recording beams in a manner which produces a plurality of spatially multiplexed holograms within the same recording element.

Isotropic materials, such as dichromated gelatin, have long been used as recording media for various types of amplitude and phase holograms. A thin film of the material is applied to a substrate, and the hologram is recorded by an opto-chemical photographic process. The post-exposure chemical development slows the recording process, and the thinness of the recording film reduces the data storage capacity. The chemical development also makes it difficult to use this type of hologram for computer data storage applications.

Ferroelectric photorefractive materials, such as strontium barium niobate (SBN) and lithium niobate (LiNbO3), have been investigated as alternative holographic recording media. A relatively thick crystalline form of the material is used, and the hologram is recorded by an electro-optical process which can occur in the millisecond or microsecond regime, or even faster using pulsed laser sources.

The usual model for photorefractive recording in non-linear optical materials explains the process as a photoelectric excitation of donor electrons into the conduction band, followed by charge migration and subsequent trapping of the charge carriers, resulting in a space charge distribution within the material which is related to the light intensity distribution of the interference pattern set up by the recording beams. The magnitude of the space charge field initially increases with recording energy, and then approaches asymptotically a saturation value. The excited donor electrons are temporarily trapped at trap sites producing localized changes in the index of refraction of the material. These changes are a function of the induced space charge field, the external voltage gradient applied across the crystal, and the electro-optical parameters of the material, particularly the dielectric tensor and the electro-optic tensor. The physical mechanism is defined by the following equation, which indicates the change in the optical susceptibility of the crystal ($\bar{\bar{\epsilon}}$) caused by the space charge field ($\bar{E}$):

$$\Delta\bar{\bar{\epsilon}} = -\bar{\bar{\epsilon}}_\omega \cdot (\bar{r} \cdot \bar{E}) \cdot \bar{\bar{\epsilon}}_\omega$$

(where $\bar{\bar{\epsilon}}_\omega$ denotes the dielectric tensor and r is the electro-optic tensor).

The resulting variations in the index of refraction of the material define a recorded hologram. When the material is then re-illuminated with a reconstruction beam, these variations in the index of refraction produce phase modulations in the light, resulting in a reconstruction beam which reconstructs in optical form the information stored in the hologram.

Different reconstruction polarizations (relative to the crystal axis of the recording material) produce different reconstruction efficiencies, $\eta$, as determined by the optical susceptibility tensor. Jones Calculus can be used to calculate these different efficiencies, as follows:

$$\eta \propto |\hat{P}_{OUT}^T \cdot \Delta\bar{\bar{\epsilon}} \cdot \hat{P}_{IN}|^2$$

where $\hat{P}_{IN}$ and $\hat{P}_{OUT}$ are the reconstruction input and the reconstructed output Jones Vectors and $\Delta\bar{\bar{\epsilon}}$ is given by the equation set out in the preceeding paragraph.

A difficulty with holograms in photorefractive media is the problem of destructive reconstruction. Where the recording cycle is substantially symmetrical with the reconstruction cycle, the re-illumination reference beam (i.e., the reconstruction beam) which is used to retrieve the recorded information excites the donor electrons and disturbs the equilibrium of the space charge field in a manner which produces a gradual exponential erasure of the recording. This reduces the number of reconstructions that can be made before the signal-to-noise ratio becomes too low. Moreover, because recordings are similar to reconstructions in terms of electron excitation, each recording can degrade earlier recordings in the same region of the recording medium. This restricts the ability to use the three-dimensional capacity of a photorefractive crystal for recording spatially multiplexed holograms. An ideal recording/reconstruction cycle would be asymmetrical, that is, it would take more energy to erase a recording than is used to make the recording in the first place.

A number of investigations have been carried out regarding the photorefractive phenomenon and architectures for repeated data recording and reconstruction of optically encoded information. Recycling is the usual means suggested for permanent data storage. However, several techniques have been suggested for fixing the hologram to achieve repeated reconstruction without recycling. Heat fixing and electrical fixing are two examples.

Heat fixing involves heating the crystal above the Curie temperature during the recording phase and subsequently cooling below the critical temperature so that the electric field patterns of the hologram induce corresponding polarization domains which are stable at room temperature. The recording is erased by again heating above the Curie temperature.

Electrical fixing involves a procedure by which the hologram is first poled to align all polarization domains with a field well above the coercive field. A hologram is recorded and is then fixed by applying an electric field antiparallel to the original poling field. Polarization reversal occurs at those locations where the sum of the space charge field and the applied field is above the coercive field, resulting in a replication of the original trapped charge pattern. This pattern masks the holographic space charge field, and the efficiency of the reconstruction is initially low. Upon re-illumination with the reference beam, the charges redistribute themselves to reveal the domain pattern. The ultimate efficiency is high (often higher than the original efficiency before the switching field was applied), caused by over-cancellation of the space charge field by local polarization switching. The recording is erased by applying another poling field.

The techniques suggested by these prior investigations have limited utility because they involve substantial extraneous processing steps and/or equipment. A need exists for a more convenient and effective method for promoting an asymmetrical recording/reconstruction cycle in photorefractive media. Ideally, such a method also would provide an enhanced reconstruction in which the efficiency actually increased above its starting value. The present invention fulfills these needs.

SUMMARY OF THE INVENTION

Briefly, and in general terms, the present invention provides a new and improved method to promote recording/reconstruction asymmetry for holograms recorded in photorefractive media. The method can, under certain conditions, produce an enhanced reconstructed output that is substantially nondestructive over a typical reconstruction cycle or a plurality of reconstruction cycles.

More specifically, and in a presently preferred embodiment, by way of example and not necessary by way of limitation, a method embodying features of the present invention uses selected polarization states for the reconstruction beam and the recording beams, and records with a relatively high applied voltage and selected recording energy levels. These conditions, in conjunction with other parameters, such as reconstruction beam intensity, geometry and external applied voltage during reconstruction, can produce a particularly asymmetrical recording/reconstruction cycle. Reducing the reconstruction beam power enhances the effect. Reducing the applied voltage during reconstruction also enhances the effect. By combining these parameters in a selective manner, the reconstructed output can be made substantially nondestructive over a typical reconstruction cycle, and actual enhancement of the reconstruction efficiency over its starting value can be achieved.

In a typical example, the hologram is first recorded with ordinary polarized reference and object beams and an external applied field of about 4 Kv/cm. The cummulative recording energy is about 7 mJ. The polarization state of the reconstruction beam is then rotated ninety degrees relative to the polarization state of the recording beams. Also, during the reconstruction phase, a reduced external field (typically about 0–1 Kv/cm) is applied. The resulting reconstructed output beam first drops in intensity, but subsequently grows in strength to values well above the starting point. The reconstructed output also can have an erasure time exceeding about forty-five minutes.

The amount of relative polarization rotation, the reconstruction beam intensity, the applied field during recording, the applied field during reconstruction, the recording geometry, the spatial frequency of the grating, the properties of the recording materials, and the time sequencing or pulsing of the recording beams and the reconstruction beam can all be adjusted to tailor the shape of the reconstruction history curve. By proper selection and adjustment of these parameters in accordance with the present invention, a desired asymmetrical recording/reconstruction cycle and enhanced nondestructive reconstruction can be achieved.

These and other objects and advantages of the invention will become apparent from the following more detailed description, taken in conjunction with the accompanying drawings, which describe by way of illustrative examples, the features of the present invention.

DESCRIPTION OF THE PREFERRED EMBODIMENTS

Figure 1:
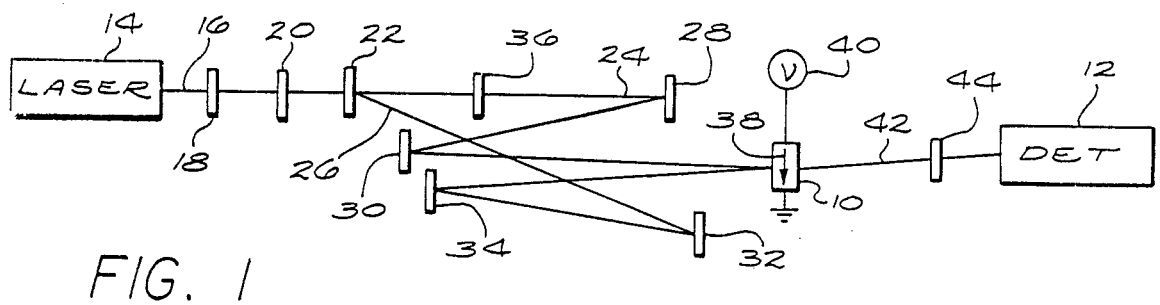
FIG. 1 is a schematic diagram of hologram recording and reconstruction apparatus which is useful in carrying out the novel features of the present invention.

As shown in the drawings for purpose of illustration, and with particular reference to FIG. 1, the presently preferred embodiment of the invention resides in a method and in related apparatus for recording a data storage hologram in a ferroelectric photorefractive crystal 10, and for providing, at a detector 12, an enhanced reconstruction of the recorded information which is substantially nondestructive over a typical reconstruction cycle or plurality of reconstruction cycles.

An illumination source 14 provides coherent light for recording and reconstruction. In a preferred embodiment, the illumination source 14 is a conventional argon ion laser tuned to either 514 nm or 488 nm. Collimation optics (not shown) are utilized in conjunction with the source 14 to provide a collimated illumination beam 16.

The illumination beam 16 passes through a neutral density filter 18 and a half-wave plate 20, and then passes through a beam splitter 22 where it is separated into a reference beam 24 and an object beam 26. Each beam is preferably about 1.0 mm in diameter. The reference and object beams 24 and 26 are reflected by respective sequential folding mirrors 28, 30, 32 and 34, which direct the beams toward the recording crystal 10 at the desired angle and spatial separation. In the recording mode, the reference and object beams 24 and 26 intersect and set up an interference pattern which is recorded in the crystal 10 by the photorefractive process. Spatially multiplexed holograms are recorded by selectively changing the positions and orientations of the mirrors 28–34 so as to alter the directions of the reference and object beams 24 and 26. For data storage applications, a beam modulating transducer (not shown) is placed in the path of the object beam 26 to optically encode onto that beam the information which is to be stored in the hologram. During the reconstruction mode, the object beam 26 is blocked in any convenient manner before it reaches the crystal 10, so that the reference beam 24 can serve as the re-illumination reconstruction beam.

The neutral density filter 18 is used in conjunction with a second neutral density filter 36 placed in the path of the reference beam 24 between the beam splitter 22 and the first folding mirror 28 to control the intensity and relative intensities of the reference and object beams 24 and 26. The half-wave plate 20 is used to control the polarization state of the beams 24 and 26. Selective orientation of the plate 20 produces different amounts of polarization rotation.

Although the invention has been described thus far with reference to a system in which the same optical apparatus is used for reconstruction and recording, it is appreciated that different apparatus in different environments can be used for reconstruction and for recording, if desired.

The preferred recording element 10 is a crystal, typically about 1 cm×1 cm×½ cm in size, formed of ferroelectric photorefractive material. The crystal is poled in the direction of its optical axis 38 and oriented such that the hologram grating vectors are also in the direction of the axis 38 when using the preferred SBN recording media (0.05% Cerium doped SBN:60). For other ferroelectrics, the grating vector may be oriented in another direction corresponding to a large electro-optic coefficient. Other types of photorefractive materials can be used if they have the appropriate electro-optical parameters (such as dielectric tensor and electro-optic tensor) or if they can be made to exhibit appropriate electro-optical properties by adjusting material constants, external applied voltage and polarization of the recording and reconstruction beams. Bismuth Silicon Oxide (BSO) is one example. Barium Titanate, Lithium Niobate, Potassium Tantalate, and Bismuth Germanimun Oxide are other possibilities.

Electrodes (not shown) are placed across the crystal 10 and a high voltage power supply 40 is used to apply an external electric field in the range of about 0 Kv/cm–8 Kv/cm aligned with the crystal axis 38. In a typical embodiment, the applied field during the recording cycle is in the range of about 3–6 Kv/cm (but could be much higher with appropriate precautions to prevent electrical breakdown in the surrounding medium), and is preferably about 4 Kv/cm. In general, a much lower applied voltage, typically about 0 Kv/cm–1 Kv/cm, is used during the reconstruction cycle.

An optical detector 12, such as a conventional photodiode or CCD array, is positioned to receive the reconstructed output beam 42 generated by the hologram during the reconstruction cycle. A neutral density filter 44 placed in the path of the output beam 42 controls the intensity of the light which is incident on the detector 12. The detector 12 is typically an electro-optical device which converts the optical information encoded on the reconstruction beam 42 into electrical signals which are used by data processing or signal processing circuitry (not shown).

In accordance with the present invention, an asymmetrical recording/reconstruction cycle for the holograms recorded in the crystal 10 is obtained by using selected recording conditions and selected polarization states for the reconstruction and the recording beams. Under appropriate conditions of applied voltage and beam intensity, the effect of a high applied electric field during the recording phase and a strong energy transfer during the reconstruction phase triggers an enhanced nondestructive reconstruction phenomenon which substantially lengthens the duration of the reconstruction cycle and results in actual growth of the reconstruction efficiency above its starting value.

Figure 2A:
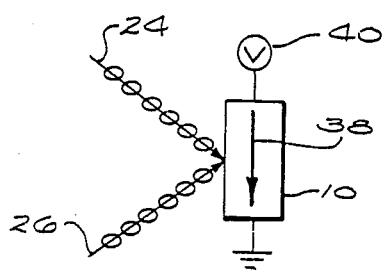
FIG. 2A and 2B are enlarged, fragmentary views of the schematic diagram of FIG. 1, showing preferred polarization states for the reference and object beams used for recording and the reference beam used for reconstruction, respectively.
Figure 2B:
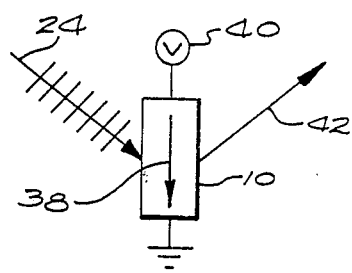

A presently preferred method for carrying out the invention is best understood by comparing FIGS. 2A and 2B.

During the recording cycle, as shown in FIG. 2A, the reference and object beams 24 and 26 are given an ordinary polarization state. For purposes of illustration only, the state is indicated as being perpendicular to the plane of the figure. The power supply 40 applies a relatively high external voltage (typically about 4 Kv/cm) across the photorefractive crystal 10 in the direction of the crystal poling and the cummulative recording energy is built up to about 2 mJ or more.

During the reconstruction cycle, as shown in FIG. 2B, the polarization state of the reference reconstruction beam 24 is rotated to the extraordinary state. Again, for purposes of illustration only, the polarization state is indicated as being parallel to the plane of the figure. The degree of asymmetry achieved by the rotated reconstruction beam is related to the relative polarization of the reconstruction beam with respect to the electro-optic tensor. In most cases, an extraordinary polarization to the state used during recording will produce maximum effects. Extraordinary polarization for both reconstruction and recording will also, under appropriate recording conditions, produce substantial asymmetry, albeit generally somewhat less. For SBN, the effect is most pronounced at low to moderate spatial frequency (e.g., about 100 1/mm–500 1/mm).

In addition to using a rotated reconstruction beam 24, the preferred reconstruction cycle also uses, in most cases, a reduced applied voltage. Values of 0 Kv/cm–1 Kv/cm are typical. Again, the voltage level has an effect on the degree of asymmetry which is achieved, and in general, lower voltages produce greater asymmetry effects.

Figure 3:
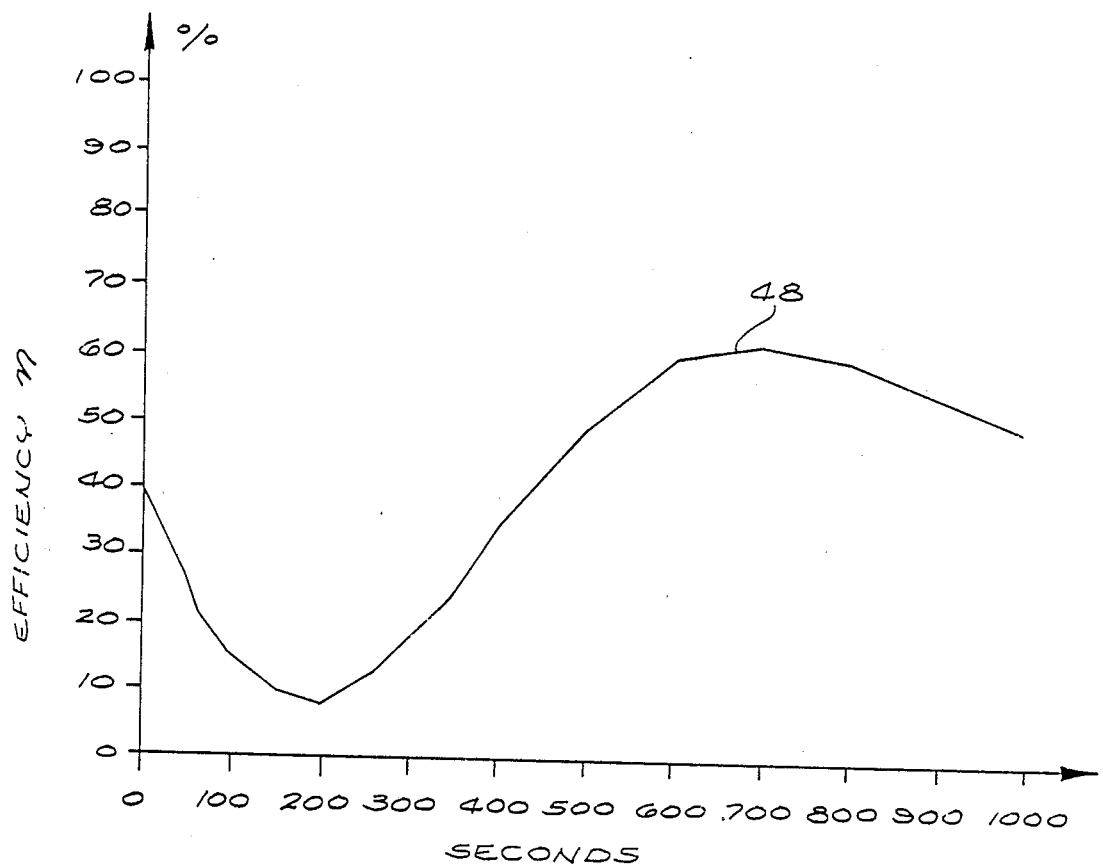
FIG. 3 is a graphical representation of reconstruction efficiency versus time, showing a typical reconstruction history curve for the preferred ordinary polarized recording beams and the preferred reconstruction beam with a polarization state which is rotated ninety degrees relative to the polarization state of the recording beams.

The asymmetry affect achieved by the present invention can best be understood by reference to FIG. 3. When the polarization state of the reconstruction beam is extraordinary and the state of the beams used during the recording cycle are ordinary, the reconstruction history curve 48 for the reconstructed output beam 42 has a substantially increased half-life and an increased starting efficiency. Under certain conditions, the curve 48 grows in strength well beyond its starting efficiency.

Figure 4:
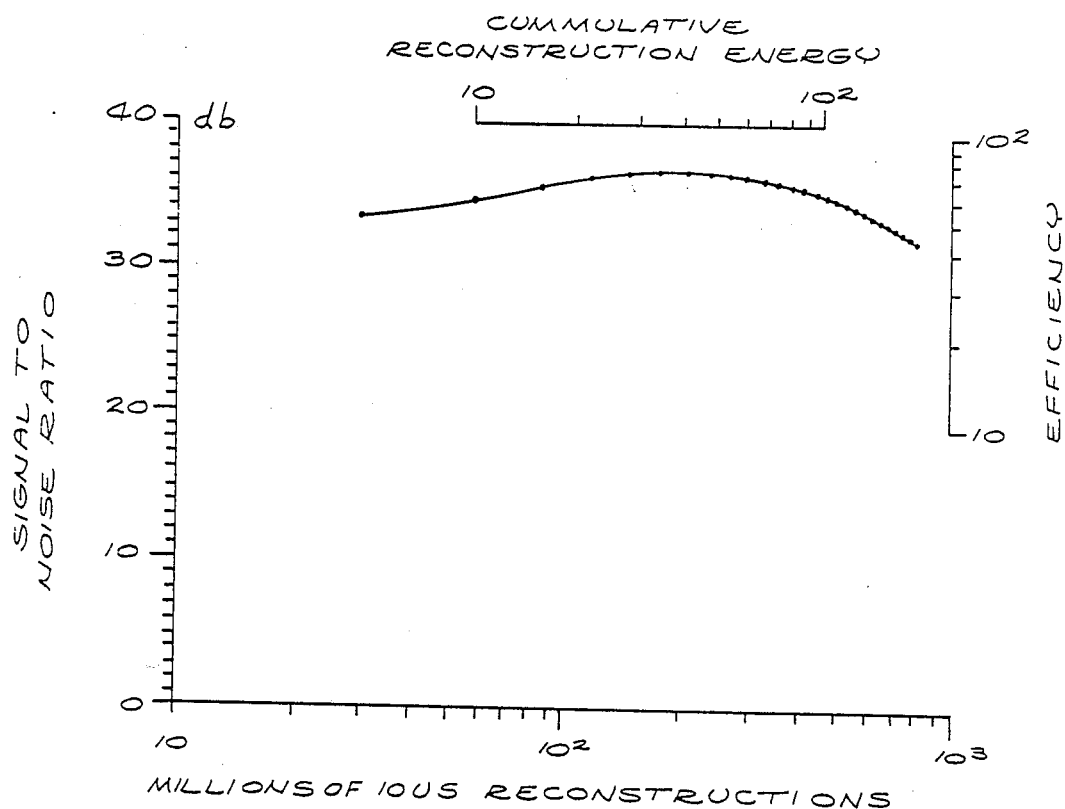
FIG. 4 is a graphical representation of signal-to-noise ratio versus number of ten microsecond/one microwatt reconstructions, and reconstruction efficiency versus cumulative reconstruction energy, using the preferred polarization states for the recording and reconstruction beams and preferred recording parameters (i.e., 100 l/mm to 500 l/mm spatial frequency during recording, 4 kv/cm applied voltage during recording, and 2 to 7 mJ recording energy)

In an application which uses short pulses of light to reconstruct the contents of a recording many times, the present invention can achieve a substantial increase in the number of reconstructions that can be made before the recording is erased. As shown in FIG. 4, the signal-to-noise ratio for multiple one microwatt/ten microsecond reconstructions exhibits an initial climb, and then gradually starts to decay when the number of reconstructions exceeds about two hundred million.

The enhanced performance of the reconstruction process and an asymmetric recording/reconstruction cycle (i.e., longer reconstruction than recording times) may be obtained in a variety of ways. It is believed at this time, that one possible explanation for the enhanced nondestructive reconstruction phenomenon can be made in terms of a physical model describing photo-excitation during hologram recording and subsequent modification of the grating during reconstruction. The generic principles and a preferred embodiment will now be discussed for the preferred SBN recording medium.

The strength of the reconstruction for various polarization states can be determined using the specific dielectric tensor for the particular material and the Jones Calculus equation discussed earlier. For SBN, looking at (a) ordinarily polarized reconstruction by an ordinarily polarized reconstruction beam at an angle $\alpha$ to the z-axis (crystal or c-axis), and (b) extraordinarily polarized reconstruction by an extraordinarily polarized beam also at an angle $\alpha$ to the z-axis, we can compute the efficiency as being:

$$\eta_{0\text{-}0} = |N_0^4 r_{33} \cos\beta|^2$$

$$\eta_{e\text{-}e} = |N_0^4 r_{33} \cos\beta\cos^2\alpha - N_e^4 r_{13}\cos\beta\sin^2\alpha|^2$$

where B is the angle between the reconstruction beam and the grating vector, Kg. If the grating is in the direction of the crystal axis and the reconstruction is close to perpendicular, which is often the case:

$$\alpha \approx 90° \quad \beta \approx 0°$$

$$\eta_{0-0} \approx |N_0^4 r_{33}|^2$$

-continued $$\eta_{e-e} \approx |N_e^4 r_{13}|^2$$

For SBN, the magnitude of this difference can be computed as follows:

$$r_{33} = 420 \times 10^{-12}$$
$$r_{13} = 67 \times 10^{-12}$$
$$N_e \approx N_0$$

$$\frac{\eta_{e-e}}{\eta_{0-0}} \approx \frac{420^2}{67^2} \approx 39$$

SBN, being birefringent, exhibits diffraction properties which are polarization dependent. As indicated above, the efficiency for reconstruction with extraordinary light is higher than when reconstructing with ordinarily polarized light. This describes the relative strength of the reconstructed signal for a given space charge field, and thus may account for the increased efficiency of the reconstructed beam at the start of the reconstruction cycle.

The time evolution of the reconstructed signal may be understood by considering fundamental photorefractive processes.

Holographic recording in photorefractives can be modeled using a set of coupled differential equations describing the generation and recombination of charge carriers. Solutions (or approximations to exact solutions) allow the recording and reconstruction processes to be studied under certain simplifying assumptions. The results of these calculations show that the space charge field initially increases (usually linearly) with time. Later on it increases asymptotically, approaching a saturation value depending on materials properties and the optical recording geometry. However, under certain recording conditions (namely, the presence of an applied field during recording, values of the applied and diffusion field much smaller than the saturation field, and in drift dominated recording), the space charge field may build up in a damped oscillatory manner with a large time constant $\tau g$. This time constant is larger than in the no-field case. The frequency of oscillation, $\omega g$, is linearly proportional to the applied field, the spatial frequency of the grating, the intensity of the illumination pattern, and other material and geometrical parameters:

$$\tau_g = \frac{(1 + \theta^2 v^2)^2 + (\theta^2 v E_a)^2}{(1 + \theta^2 v^2)} \cdot \tau_c$$

$$\omega_g = \frac{\theta^2 v^2 E_a}{(1 + \theta^2 v^2)} \cdot \frac{1}{\tau_g}$$

$v$ = spatial frequency of the grating
$\theta^2 = \mu \tau_R E_{sat} K$ = diffusion length parameter
$E_a$ = applied field
$\tau_c$ = dielectric relaxation time in material with permutivity $\epsilon_c$ and mobility $\mu_c$
$\tau_R$ = free electron lifetime at intensity $I_c$.

Thus, for certain recording geometries and appropriately chosen materials, such as SBN, the space charge field, and the initial strength of the reconstructed beam diffracted from the grating, will oscillate as a function of the cummulative recording energy.

Figure 6:
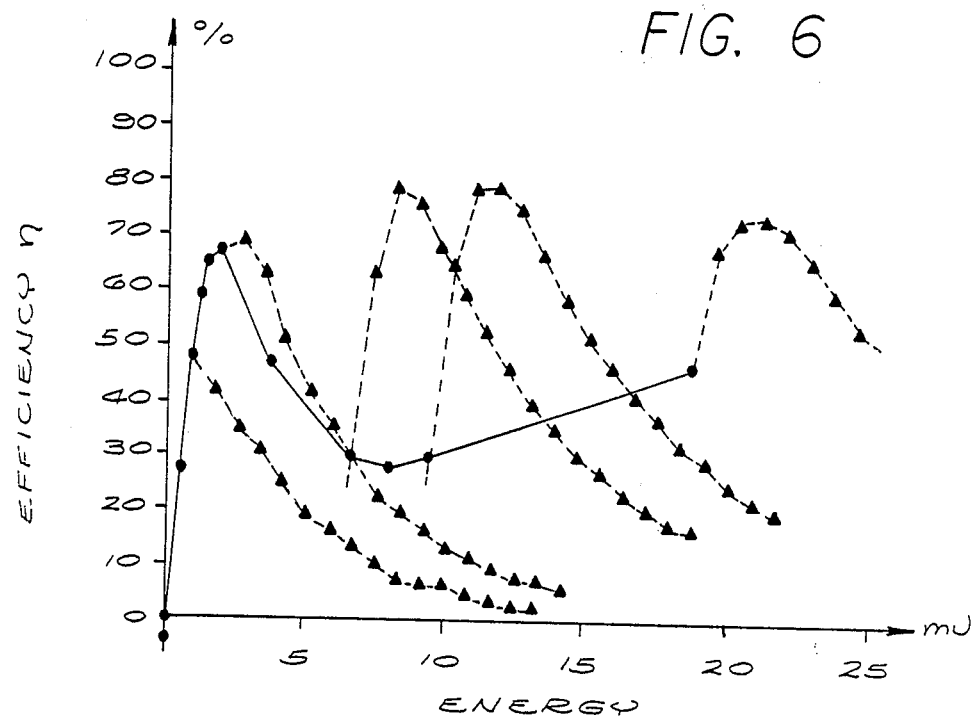
FIG. 6 is a graphical representation of the recording/reconstruction process for the preferred polarization states and recording parameters (excluding recording energy), showing in solid lines the starting reconstruction efficiency versus cummulative recording energy, and showing in dashed lines a family of reconstruction history curves for various amounts of final cumulative recording energy.

Referring now to FIG. 6, it can be seen that, depending upon the cummulative recording energy at the termination of the recording cycle, the efficiency history of the reconstructed beam may exhibit an exponential decay (for energy levels below the initial peak in reconstruction efficiency), or it may first decay, then increase, and subsequently decay, more or less exponentially, sometimes with more than one decay time constant (for energy levels above the initial peak in reconstruction efficiency). In this particular example, the growth of the reconstructed beam efficiency is most pronounced when the recording beams are ordinarily polarized, a relatively large electric field (2 to 4 kV/cm) is applied across the crystal during recording, the spatial frequency of the grating is in the range of 100 l/mm to 500 l/mm, and an extraordinary polarized beam is used for reconstruction. The growth in the amplitude of the reconstructed beam efficiency is strongest when the recording is terminated at such a point in the cycle that the cummulative recording energy produces a starting reconstruction efficiency which is at the low point just beyond the initial peak value, as shown in FIG. 6, corresponding to points for which the recording energy is about 6 to 9 millijoules. The effect of signal growth is most pronounced for a uniaxial crystal such as SBN when the grating is written with light of a polarization state corresponding to a smaller coefficient and reconstructed with an orthogonal state corresponding to a larger electro-optic coefficient, as described above.

After the space charge field has been established inside the material as described above, an incident reconstruction beam may diffract from the induced changes in the index of refraction of the medium and produce the reconstructed beam. For a given space charge field, the reconstructed beam generally exhibits a behavior in which the intensity of the beam decays exponentially with time. However, under the conditions described above, energy coupling between the reconstruction beam and the reconstructed beam produces an oscillatory behavior in the intensity of the reconstructed beam. Initially, little energy is transferred from the reconstruction beam to the reconstructed beam, but as time progresses, this transfer process increases the magnitude of the reconstructed beam intensity, at the expense of energy in the reconstruction beam. Ultimately, the space charge field is erased by the illumination of the reconstruction beam. This oscillating behavior depends on the applied field during reconstruction among the other parameters discussed above.

Figure 7:
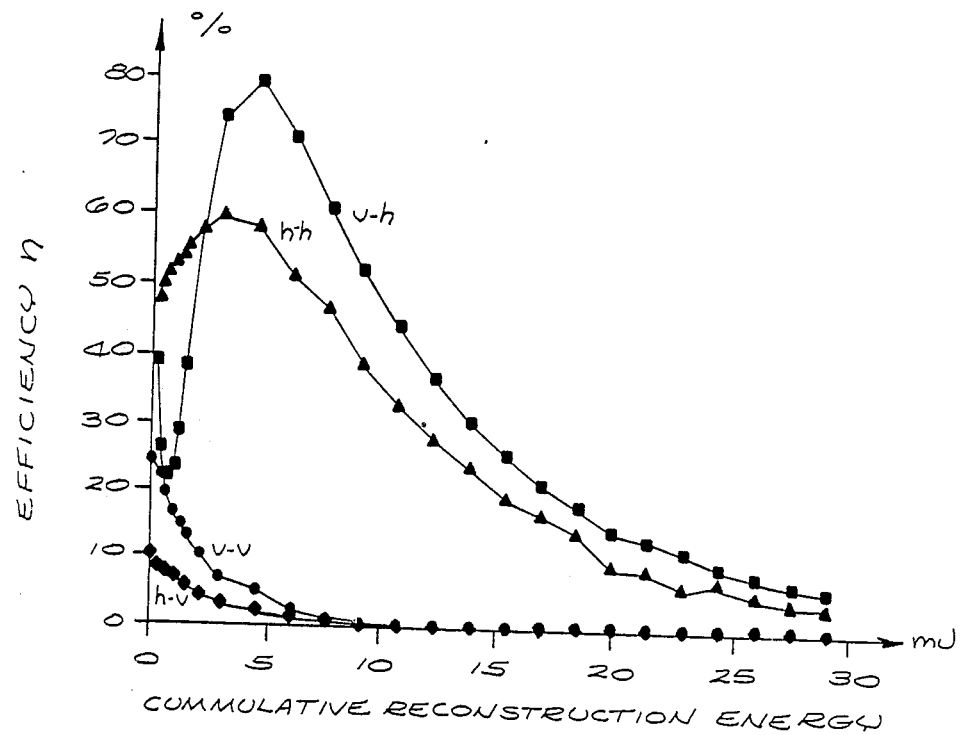
FIG. 7 is a graphical representation of reconstruction efficiency versus cummulative reconstruction energy, showing a family of curves for various combinations of ordinary (v) and extraordinary (h) polarization for the recording and reconstruction beams (e.g., "V-H" indicating ordinary recording and extraordinary reconstruction), and for the preferred recording parameters.
Figure 10:
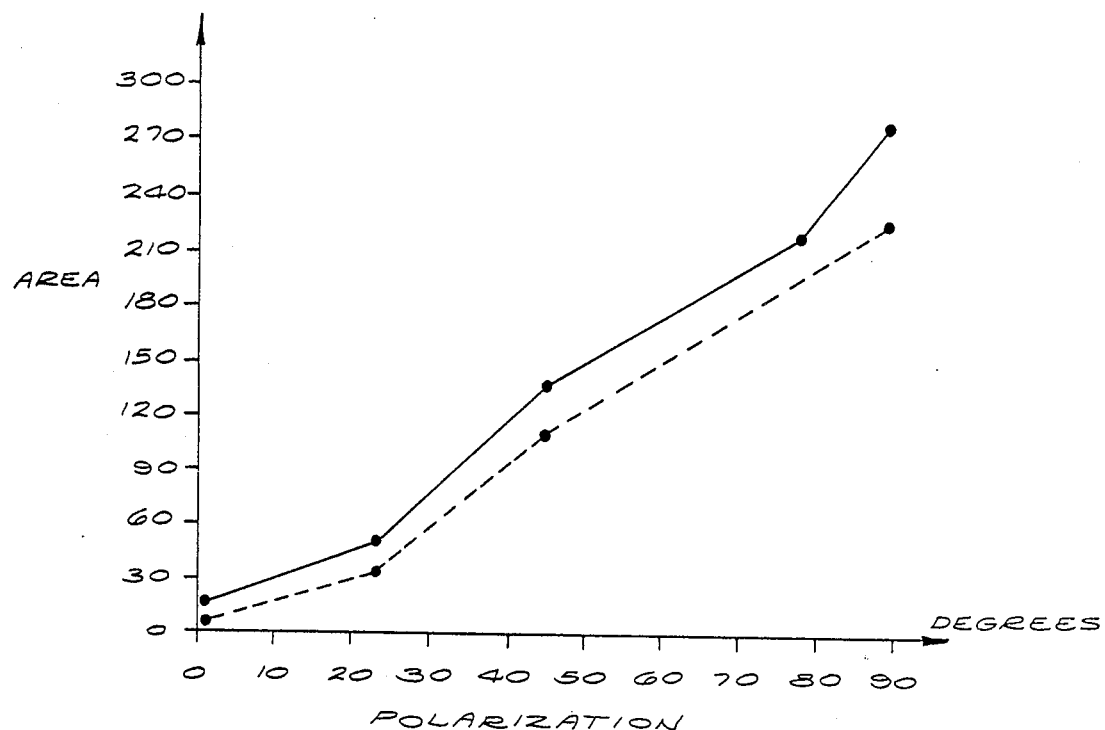
FIG. 10 is a graphical representation of the area under the reconstruction history curve versus polarization of the reconstruction beam (ordinary polarization being 0° and extraordinary being 90°), and showing in solid lines a curve for ordinary polarized recording and in dashed lines a curve for extraordinary polarized recording, both for the preferred recording parameters.

The effect of using different combinations of ordinary and extraordinary beams for recording and reconstruction in the procedure described above is best understood by reference to FIG. 7. It is also illustrated by FIG. 10, which demonstrates that extraordinary (90°) reconstruction polarizations produce increased area under the reconstruction history curve, resulting in greater energy being coupled out during reconstruction and a greater duration reconstruction for a given reconstruction beam power. The enhanced nondestructive phenomenon is exhibited to a substantial degree when the recording beams are ordinary (0°) and the reconstruction beam is extraordinary (90°), or (generally to a lesser degree) when both the recording and the reconstruction beams are extraordinary (90°).

Figure 8:
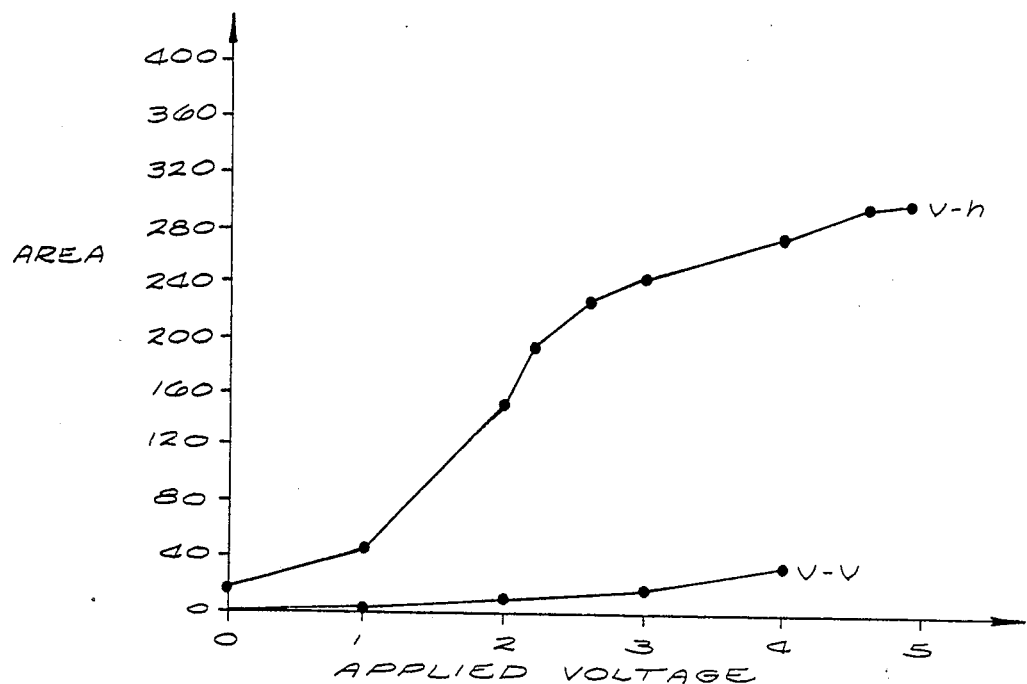
FIG. 8 is a graphical representation of the area under the reconstruction history curve versus external voltage applied during recording, showing curves for various combinations of polarization for the recording and reconstruction beams and for the preferred recording parameters.

Desirable enhanced nondestructive performance is generally obtained when the external field applied to the recording medium during reconstruction is reduced substantially below the level used during recording or is completely eliminated. As shown in FIG. 8, a certain minimum applied voltage during recording (e.g., about 2–3 Kv/cm) is generally used to trigger the enhanced nondestructive phenomenon.

By appropriately adjusting various parameters, the characteristics of the enhanced nondestructive reconstruction phenomenone can be tailored to suit particular needs.

The exact shape of the reconstruction history curve depends upon a variety of factors such as beam polarization, applied voltage and beam intensity, but in general, the shapes fall into several patterns which can be characterized generically by the curve, as shown in FIG. 3, which starts at a relatively high initial efficiency (e.g., about 40%), drops fairly quickly, rises to a second peak well above the starting efficiency (e.g., rises to an efficiency of about 60%), and then decays very gradually. Under certain conditions, as previously shown, the initial dip can be eliminated and the curve made to climb directly to a value above the starting efficiency and then gradually fall off. Under other conditions, the curve can be made essentially flat thereby extending the reconstruction. The decay rate becomes smaller for longer recording times or larger recording energies.

Figure 9:
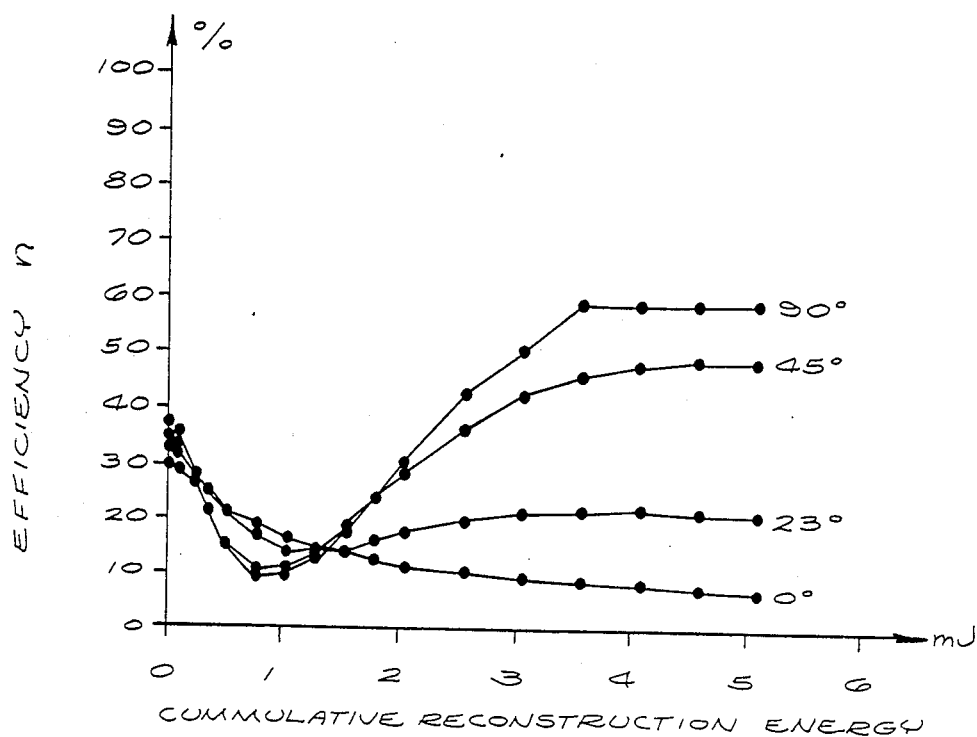
FIG. 9 is a graphical representation of reconstruction efficiency versus cumulative reconstruction energy for ordinary polarized recording and for the preferred recording parameters, and showing a family of reconstruction history curves for various amounts of reconstruction beam polarization rotation relative to the polarization state of the recording beams.

The polarization aspect of the nondestructive effect of the preferred embodiment is best illustrated by reference to FIG. 9. In the case of the preferred recording conditions, it can be seen that the extent of the enhanced nondestructive phenomenon is directly related to the amount of relative polarization rotation of the reconstruction beam, with the maximum effect generally being obtained at ninety degrees relative rotation and gradually dropping off with any reduction in relative rotation below that level. The illustrated curves are typical for a system, as shown in FIG. 1, where the spatial frequency of the reference and object beams 24 and 26 during recording is about 200 l/mm, the recording power is about 20 mW, the reconstruction power is about 8 mW, and the applied voltage is about 4 Kv/cm for recording and 0 Kv/cm for reconstruction.

Figure 5:
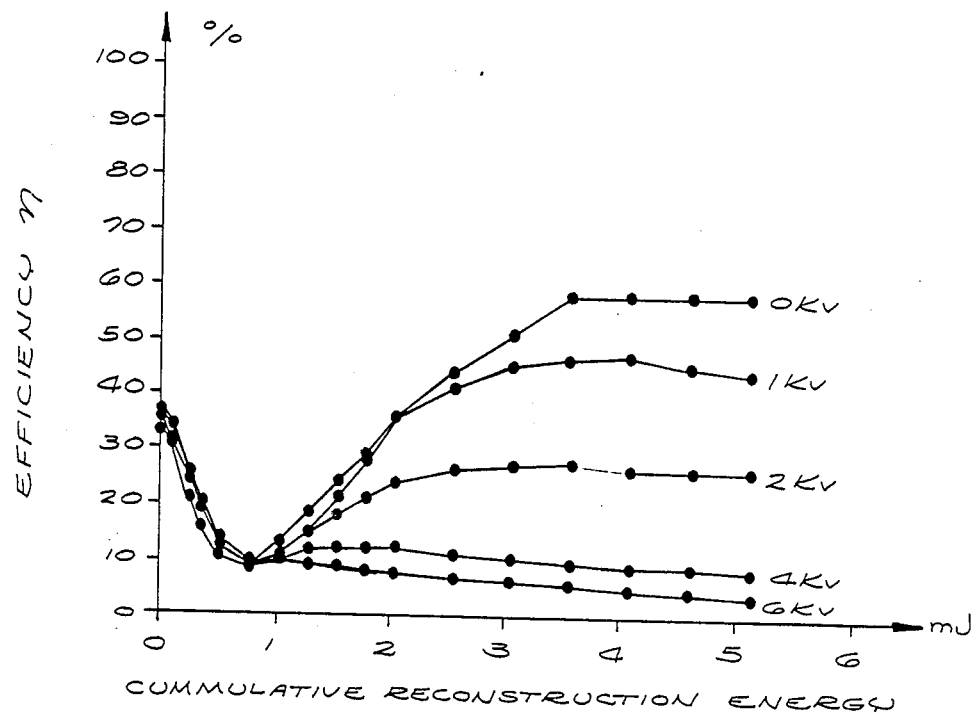
FIG. 5 is a graphical representation of reconstruction efficiency versus cumulative reconstruction energy, showing a family of reconstruction history curves for various external voltages applied during the reconstruction cycle, and for the preferred polarization states of the recording and reconstruction beams and the preferred recording parameters.

The nondestructive effect in the case of the preferred recording conditions is generally diminished at higher levels of external voltage applied during the reconstruction cycle, as shown in FIG. 5. At relatively low values of applied voltage, the efficiency of the reconstruction history curve decays more slowly as the amount of relative rotation of the reconstruction beam is increased.

Figure 11:
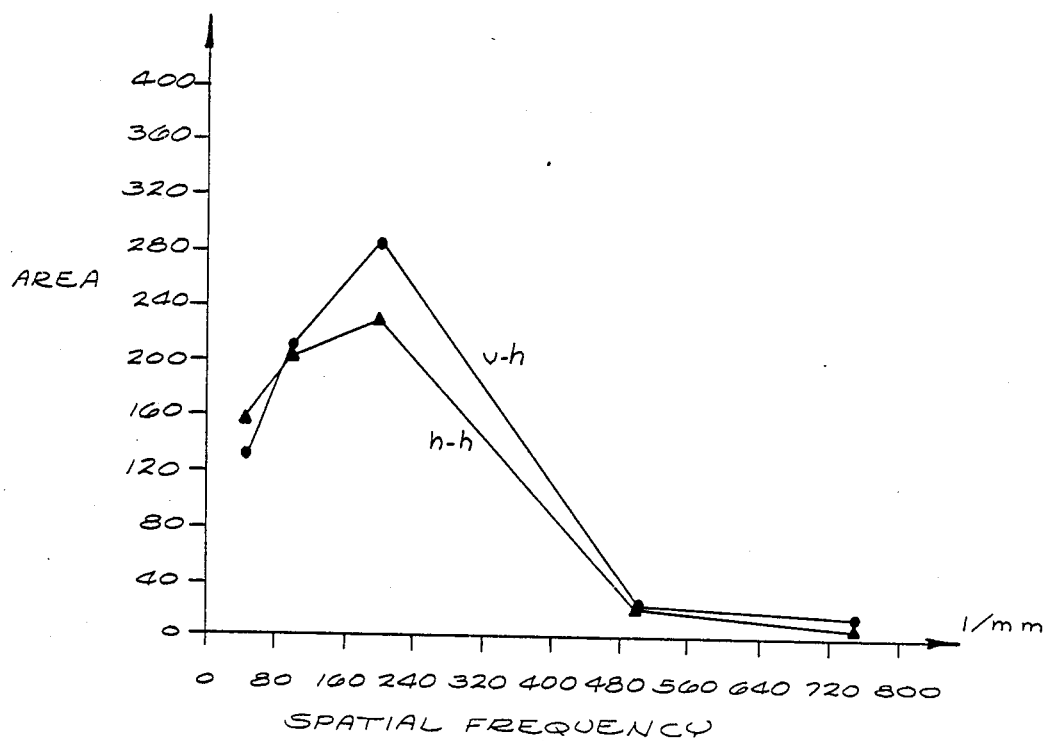
FIG. 11 is a graphical representation of the area under the reconstruction history curve versus spatial frequency of the recording for the preferred polarization states and the preferred recording parameters (excluding spatial frequency).

The effect of spatial frequency is best understood by reference to FIG. 11. It can be seen that the nondestructive effect, in the case of the preferred recording conditions, generally is enhanced as spatial frequency is increased up to about 200 l/mm and then gradually falls off with any further increase in spatial frequency.

From the foregoing, it will be appreciated that the present invention provides a new and improved method for promoting enhanced nondestructive reconstruction from holograms recorded in photorefractive materials. The method is convenient and effective, and the reconstruction history characteristics can be tailored over a wide range to suit particular needs. The reconstruction efficiency remains high over an extended period of time, becoming substantially nondestructive for a typical reconstruction cycle, or plural cycles, and under certain conditions, actual growth in reconstruction efficiency is achieved.

While several particular forms of the invention have been illustrated and described, it will be apparent that various modifications may be made without departing from the spirit and scope of the invention.

We claim:

1. A recording/reconstruction cycle for a hologram in photorefractive media, comprising:
   forming an interference pattern with light having a selected polarization state;
   exposing photorefractive recording media to said interference pattern to produce a diffusion field and record a hologram therein;
   applying a first electric field to said recording media during said recording, said first electric field, said recording media, and said interference pattern being selected to produce drift dominated recording and values of said first electric field and diffusion field smaller than the saturation field for said recording media;
   terminating said recording when the cummulative recording energy exceeds a value which produces an initial peak reconstruction efficiency; and
   illuminating said recorded hologram with light having a selected polarization state relative to the polarization state of said light used to form said interference pattern to generate reconstructed light from said hologram.

2. The method as set forth in claim 1, wherein said light used to form said interference pattern and said light used to illuminate said recorded hologram have extraordinary polarization.

3. The method as set for in claim 1, wherein said light used to form said interference pattern has ordinary polarization and said light used to illuminate said recorded hologram has extraordinary polarization.

4. The method as set forth in claim 1, further comprising applying a second electric field to said photorefractive recording media during said illumination of said recorded hologram, said second electric field having a lower magnitude than said first electric field.

5. The method as set forth in claim 4, wherein said second electric field has a magnitude of zero.

6. The method as set forth in claim 4, wherein said first electric field has an magnitude in the range of about 3–6 kv/cm and said second electric field has an magnitude in the range of about 0–1 kv/cm.

7. The method as set forth in claim 1, wherein said recording is terminated when said cummulative recording energy is greater than about 2 mJ.

8. The method as set forth in claim 1, wherein said recording is terminated when said cummulative recording energy is in the range of about 2–7 mJ.

9. The method as set forth in claim 1, wherein said recorded hologram has a spatial frequency in the range of about 100 l/mm–500 l/mm.

10. The method as set forth in claim 1, wherein said photorefractive recording media comprises ferroelectric material.

11. The method as set forth in claim 1, wherein said photorefractive recording media comprises strontium barium niobate.

12. The method as set forth in claim 11, wherein said photorefractive recording media comprises a crystalline form of said strontium barium niobate having a size of about 1 cm×1 cm×½ cm.

13. The method as set forth in claim 11, further comprising poling said photorefractive recording media substantially in the direction of its optical axis and orienting said media so that grating vectors of said recorded hologram are substantially aligned with said optical axis.

14. The method as set forth in claim 1, wherein said photorefractive recording media comprises bismuth silicon oxide.

15. The method as set forth in claim 1, further comprising poling said photorefractive recording media substantially in the direction of its optial axis and aligning said media so that grating vectors of said hologram are oriented in a direction corresponding to a large electro-optic coefficient.

16. A method as set forth in claim 1, further comprising modulating said light having said first polarization state to encode information thereon, whereby said information is stored in said hologram recorded in said photorefractive recording media.

17. A method for promoting an asymmetrical recording/reconstruction cycle for a hologram in photorefractive media, comprising:
   forming an interference pattern with light having a selected polarization state;
   exposing photorefractive recording media to said interference pattern for a selected time at a selected power level to produce a space charge field and record a hologram therein;
   applying a first electric field to said recording media during said recording, said first electric field, said recording media and said interference pattern being selected to produce an oscillatory variation in the space charged field; and
   illuminating said recorded hologram with light having a selected polarization state relative to the polarization state of said light used to form said interference pattern to generate reconstructed light from said hologram for a duration greater than said selected time.

* * * * *